(12) United States Patent
Rakshit et al.

(10) Patent No.: US 10,649,885 B2
(45) Date of Patent: May 12, 2020

(54) LEGACY APPLICATION DATA FLOW TRACKING

(71) Applicant: International Business Machines Corporation, Armonk, NY (US)

(72) Inventors: Sarbajit K. Rakshit, Kolkata (IN); Diptiman Dasgupta, Kolkata (IN); Gopal Bhageria, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 59 days.

(21) Appl. No.: 15/826,239

(22) Filed: Nov. 29, 2017

(65) Prior Publication Data

US 2019/0163604 A1 May 30, 2019

(51) Int. Cl.
*G06F 11/00* (2006.01)
*G06F 11/36* (2006.01)
(Continued)

(52) U.S. Cl.
CPC .............. *G06F 11/364* (2013.01); *G06F 8/61* (2013.01); *G06F 8/70* (2013.01); *G06F 11/3612* (2013.01)

(58) Field of Classification Search
CPC ............... G06F 11/364; G06F 11/3612; G06F 11/3604; G06F 11/3636; G06F 11/3644; G06F 11/366; G06F 11/30; G06F 11/3003; G06F 11/3006; G06F 11/302; G06F 11/3065; G06F 11/3072; G06F 11/3466; G06F 11/3476; G06F 8/61; G06F 8/60;
(Continued)

(56) References Cited

U.S. PATENT DOCUMENTS

| 8,782,162 B1* | 7/2014 | Deshpande | G06Q 30/0201 709/213 |
| 2011/0035725 A9* | 2/2011 | Naik | G06F 8/72 717/108 |
| 2013/0061212 A1* | 3/2013 | Krause | G06F 9/45516 717/128 |

OTHER PUBLICATIONS

Hill, James H. "Context-based analysis of system execution traces for validating distributed real-time and embedded system quality-of-service properties." In 2010 IEEE 16th International Conference on Embedded and Real-Time Computing Systems and Applications, pp. 92-101. IEEE, 2010. (Year: 2010).*

(Continued)

*Primary Examiner* — Anthony J Amoroso
(74) *Attorney, Agent, or Firm* — Scully, Scott, Murphy & Presser, P.C.; Robert Shatto, Esq.

(57) ABSTRACT

A method, system, and computer program product for tracking data flow in a given application on a computer are disclosed. In embodiments, the method comprises performing a contextual analysis of the given application to identify specified features; generating contextual tracking data for the given application; the contextual tracking data moving through the given application; tracing the movement of the contextual tracking data through the given application; generating specified information about the contextual tracking data and the movement of the contextual tracking data through the given application; recording a tracing log including this specified information; and creating a data flow sequence for the given application from the information in the tracing log. In embodiments of the invention, a data tracking software program is used for performing the contextual analysis of the given application and for generating the contextual tracking data.

20 Claims, 6 Drawing Sheets

(51) Int. Cl.
*G06F 8/61* (2018.01)
*G06F 8/70* (2018.01)

(58) Field of Classification Search
CPC ..... G06F 8/36; G06F 8/40; G06F 8/43; G06F 8/433
USPC .................................. 714/37, 38.1, 45, 47.1
See application file for complete search history.

(56) References Cited

OTHER PUBLICATIONS

Perez-Castillo, Ricardo, Ignacio Garcia-Rodriguez de Guzman, Orlando Avila-Garcia, and Mario Piattini. "On the use of adm to contextualize data on legacy source code for software modernization." In 2009 16th Working Conference on Reverse Engineering, pp. 128-132. IEEE, 2009. (Year: 2009).*

Jha, Sanjay, Meena Jha, Liam O'Brien, and Marilyn Wells. "Integrating legacy system into big data solutions: Time to make the change." In Asia-Pacific World Congress on Computer Science and Engineering, pp. 1-10. IEEE, 2014. (Year: 2014).*

Hennell et al., "The Static Analysis of Cobol Programs", ACM SIGSOFT, Software Engineering Notes, vol. 5, No. 4, Oct. 1980, pp. 17-25.

"Data Flow Diagram Software", https://www.smartdraw.com/data-flow-diagram/data-flow-diagram-software/, last downloaded Sep. 6, 2019, pp. 1-4.

\* cited by examiner

LEGACY APPLICATION DATA FLOW TRACKING

BACKGROUND

This invention generally relates to analyzing legacy applications, and more specifically, to tracking data flow in legacy applications.

Many businesses and other enterprises have existing computer software applications that are not engineered or architected for many current environments or uses. For example, many existing applications cannot perform distributed and parallel processing and are unable to be deployed on an elastic computing environment without significant changes to the existing applications' source code and application architecture. A significant challenge is applying a cost effective and simple migration and transformation process for legacy applications and products so that they can be incorporated into other computing environments.

A legacy system or application program is a previously deployed or developed application that continues to be used, typically because it still functions for the users' needs or is too expensive to replace, even though newer technology or more efficient methods of performing a task are now available. Legacy applications include, for example, thin client and server-based applications, client/server applications, client workstation applications, and proprietary client applications running on proprietary architectures and operating systems.

To implement an existing legacy application in a new computing environment and enable the application, for example, to be distributed, parallel, and demand-elastic can be a very expensive and time-consuming activity. The existing application architecture and source code need to be re-factored and significantly rewritten, tested extensively, and re-integrated with other applications that they are used with.

The cost and time to implement such a legacy application re-write can exceed the original cost and development time of the application. Given these impediments, enterprises are often unable to adapt their existing applications to new environments. New computing environments, however, often offer significant business and technical value including parallel processing, and improved performance, resiliency, accessibility and availability.

Many legacy applications do not have much documentation, and often only a very few people have knowledge about the applications, how they work, and key aspects of the legacy applications such as data flow sequences in the applications, and associated or related upstream and downstream applications.

Typically, during the redesign of any legacy application, a substantial amount of time is needed to understand the logic and functionalities of the application, related or associated upstream and downstream applications, and other important features of the legacy application. This substantial amount of time is required because there is no or only very little information readily available about the application. The large amount of time that is needed to develop the necessary understanding of the legacy application and its environment increases the cost of redesigning the application.

SUMMARY

Embodiments of the invention provide a method, system, and computer program product for tracking data flow in a given application on a computer. In embodiments, the method comprises performing a contextual analysis of the given application to identify specified features of the given application; generating contextual tracking data for the given application, the contextual tracking data moving through the given application, and tracing the movement of the contextual tracking data through the given application. In embodiments, the method further comprises generating specified information about the contextual tracking data and the movement of the contextual tracking data through the given application, recording a tracing log including said specified information about the contextual tracking data and the movement of the contextual tracking data through the given application, and creating a data flow sequence for the given application from the information in the tracing log.

In embodiments of the invention, software is installed in each legacy application server/database; and the software performs contextual analysis of the legacy code for each application and, accordingly, generates short life contextual tracking data. While generating the tracking data, the software considers exception logic, filter criteria, data branching in the legacy application, and, accordingly, generates contextual tracking data for each data transfer node of the legacy application. In embodiments of the invention, the installed software tracks the movement of the tracking data from one legacy application to another legacy application, and each tracking datum is deleted automatically once data movement log tracing of the tracking datum is completed. The software tracks the movement of each contextual tracking datum from one data transfer node to another data transfer node. The software identifies each such tracking datum uniquely and tracks processed timestamps, loading times, application names, data transfer node names, delete timestamps, and other information of or associated with the contextual tracking data.

The installed software generates contextual tracking data in each legacy application and follows the flow of the contextual tracking data along with the existing data transfer logic written in the code of the legacy application. In embodiments of the invention, during data processing/transformation, if any such contextual tracking datum is deleted or filtered out by the transformation logic of the legacy application, then the software of these embodiments of the invention regenerates another contextual tracking datum and moves this new generated tracking datum to the target legacy application. The software aggregates the tracking of the contextual tracking data and, accordingly, a sequence for the legacy application is arranged as per the data flow sequence through the legacy application.

DETAILED DESCRIPTION

Figure 1:
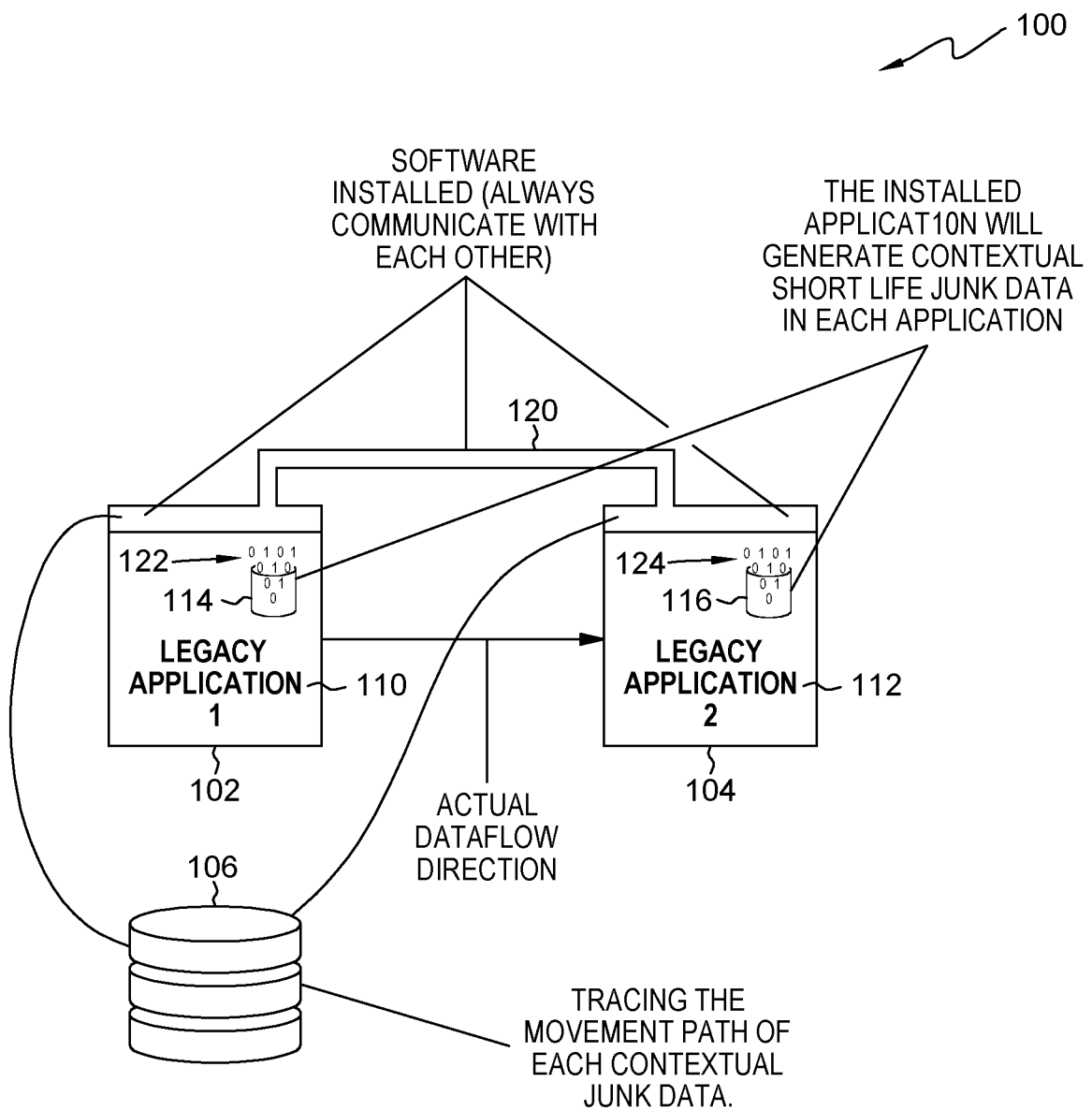
FIG. 1 illustrates an embodiment of the invention for legacy application data flow tracking.

Many businesses and other enterprises have existing computer software applications that are not engineered or architected for many current environments or uses. To implement an existing legacy application in a new computing environment and enable the application, for example, to be distributed, parallel and demand-elastic is a very expensive and time-consuming activity.

A reason for the significant expense is that many legacy applications do not have much documentation, and often only a very few people have knowledge about the applications, how they work, and key aspects of the legacy applications such as data flow sequences in the applications, and associated or related upstream and downstream applications. During the redesign of any legacy application, a substantial amount of time is need to understand the logic and functionalities of the application, related or associated upstream and downstream applications, and other important features of the legacy application. A method and system by which data flow sequences and functionalities can be tracked in legacy applications are clearly needed.

Embodiments of the invention provide a method, system, and computer program product for tracking data flow in a given application on a computer. In embodiments, the method comprises performing a contextual analysis of the given application to identify specified features of the given application; generating contextual tracking data for the given application, the contextual tracking data moving through the given application, and tracing the movement of the contextual tracking data through the given application. In embodiments, the method further comprises generating specified information about the contextual tracking data and the movement of the contextual tracking data through the given application, recording a tracing log including said specified information about the contextual tracking data and the movement of the contextual tracking data through the given application, and creating a data flow sequence for the given application from the information in the tracing log.

Contextual analysis is basically source code analysis. By analyzing the source code, various functionalities and logic mentioned in the source code can be identified. Source code analysis can also be used for identifying which code block is mapped to which functionality. In embodiments of the invention, context refers to how one code block is related to another code block. Any suitable code analysis tool may b used in embodiments of the invention.

Exception logic, or exception handling, refers to a case in which some value or data will not satisfy the code logic. For example, the equation $Y=X/Z$ does not work if $Z=0$. Thus, the source code needs to handle the case when $Z=0$, and accordingly, change the logic.

In embodiments of the invention, software is installed in each legacy application server/database; and the software performs contextual analysis of the legacy code for each application and, accordingly, generates short life contextual tracking data. While generating the tracking data, the software considers exception logic, filter criteria, data branching in the legacy application, and, accordingly, generates contextual tracking data for each data transfer node of the legacy application.

FIG. 1 illustrates a computer network system 100 in accordance with an embodiment of the invention for legacy application data flow tracing. Network 100 includes server computers 102 and 104 and database 106, and a respective legacy application 110,112 and a respective legacy application data flow tracking software application or program 114, 116 are installed on each server. The installed software applications 114, 116 communicate with each other and exchange information in the network via communications link 120. In this way, the software applications 114, 116 are able to share the server names, IP addresses, application names, unique ID of contextual tracking data, and other information. In embodiments of the invention, the software applications generate one or more contextual tracking data, represented at 122 and 124, for each data transfer node in the legacy applications.

Each such contextual tracking datum is identified uniquely, on a real time basis, and the software applications 114, 116 search for the generated tracking data and identify the positions of the data in the network. The entire trace of each tracking datum is logged, with the current application, server name, arrival time stamp, and other information of the tracking datum. Once a tracking datum is moved, and the data transfer job is stopped, then the software application 114 or 116 automatically deletes the tracking datum from the system. During the process/data transformation, if any such tracking datum is deleted before the data transfer job is stopped, then the software application 114 or 116 regenerates another contextual tracking datum, and the new generated tracking datum is transferred through the software communications link 120.

Figure 2:
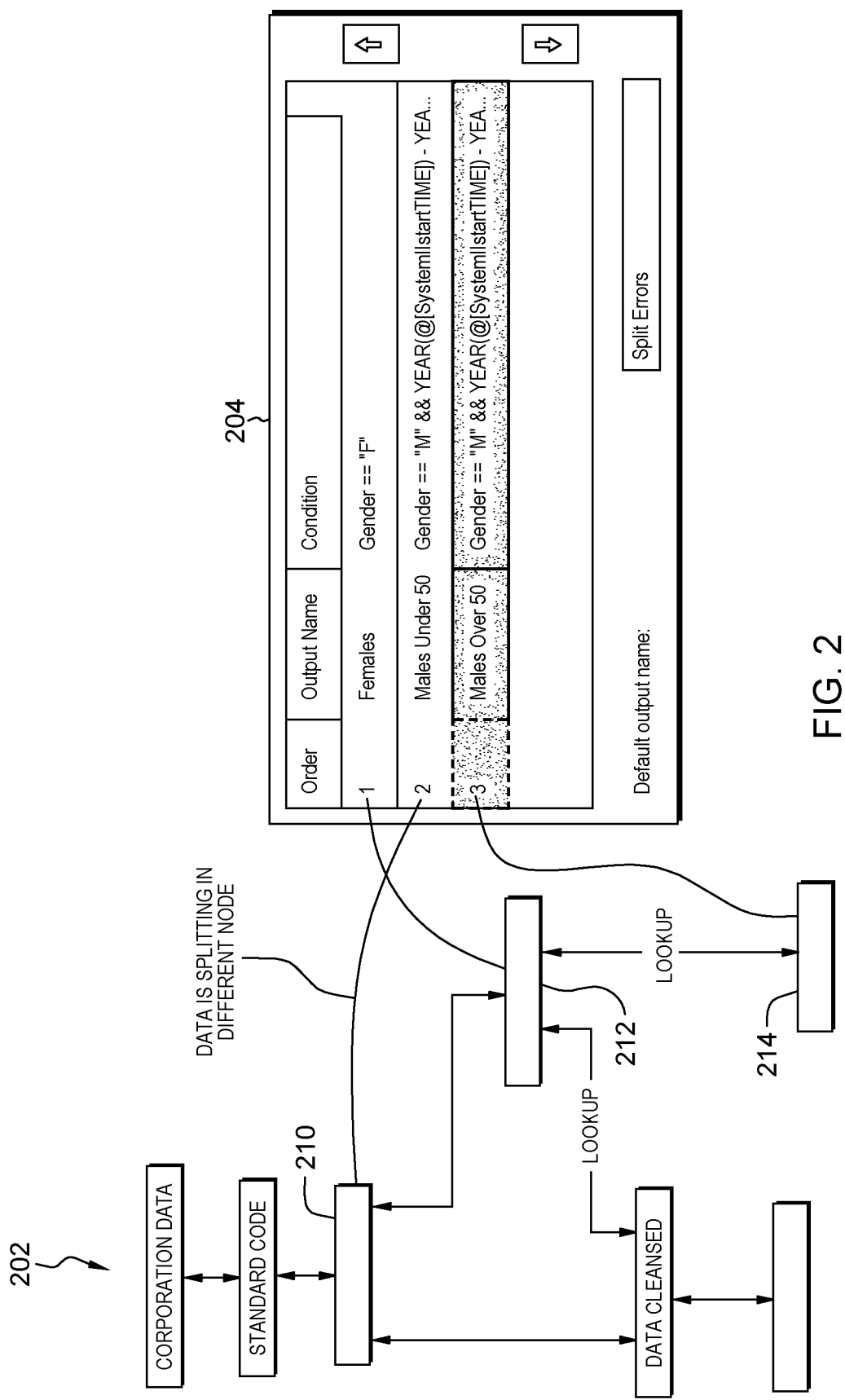
FIG. 2 shows several data transfer nodes of a legacy application and a data tracking log made in accordance with an embodiment of the invention.

FIG. 2 shows several data transfer nodes 202 of a legacy application and a data tracing log 204 made in accordance with an embodiment of the invention. In an embodiment of the invention, software applications 114, 116 perform contextual analysis of the code of the legacy applications 110, 112 and, accordingly, generate contextual tracking data for each data transfer node of the legacy applications. In this way, the software applications 114, 116 trace the entire data flow paths of the legacy applications system. The software applications 114, 116 perform contextual analysis of the code and, accordingly, appropriate contextual tracking data elements are generated so that each data transfer node of the legacy applications can track the movement of data.

The right side of FIG. 2 illustrates data splitting logic, such as Female, when Gender=F, and Male under 50, when Gender=M and Age Function<50. Basically, this is a different ETL logic. In embodiments of the invention, the code analysis system will analyze the code (like data split criteria) and will identify the logic from the code.

The source code analysis tool analyzes the code and identifies business logic, such as, for example, what does female mean, and what does male above or below 50 mean. Accordingly, the data generation engine generates data from the logic, so that valid data can be generated.

With the example shown in FIG. 2, information obtained at node 210 is stored in row 2 of the data tracing log 204, information obtained at node 212 is stored in row 1 of the log 204, and information from node 214 is stored in row 3 of the log 204.

Figure 3:
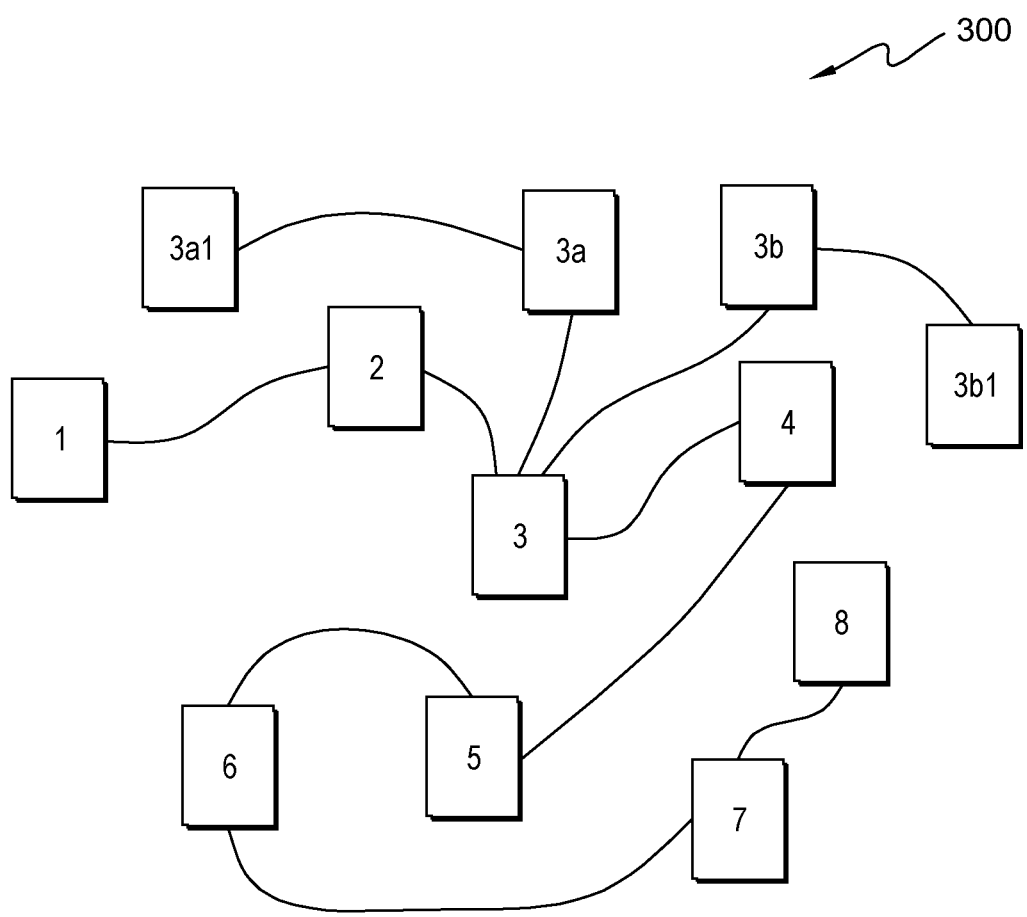
FIG. 3 shows an end-to-end data flow sequence for a legacy application that can be created from a data tracing log in an embodiment of the invention.

The data tracing log 204 can be used for tracking the movement of the data across the legacy applications 110, 112. FIG. 3 shows an end-to-end data flow sequence 300 for a legacy application created from the data tracing log. With this flow sequence, an enterprise architect can understand the entire application landscape with data flow sequence.

FIG. 3 is basically an application landscape diagram, and shows which is the source application and which application is the target application. For example, an enterprise may have applications for each of Human Resources, Production, Purchase, and Sales. As an example, data generated from the Production application will be sent to the Sales application, while at the same time, the Production application will be receiving data from the Purchase application. The diagram of FIG. 3 may also be referred to as a System Context diagram.

The data flow sequence of FIG. 3 shows that application 1 directly communicates with application 2, application 2 directly communicates with applications 1 and 3, and application 3 directly communicates with applications 2, 3a, 3b and 4. Application 3a directly communicates with applications 3a1 and 3, application 3b directly communicates with applications 3 and 3b1, and application 4 directly communicates with applications 3 and 5. Application 5 communicates with application 6, which communicates with application 7, which in turn communicates with application 8.

Figure 4:
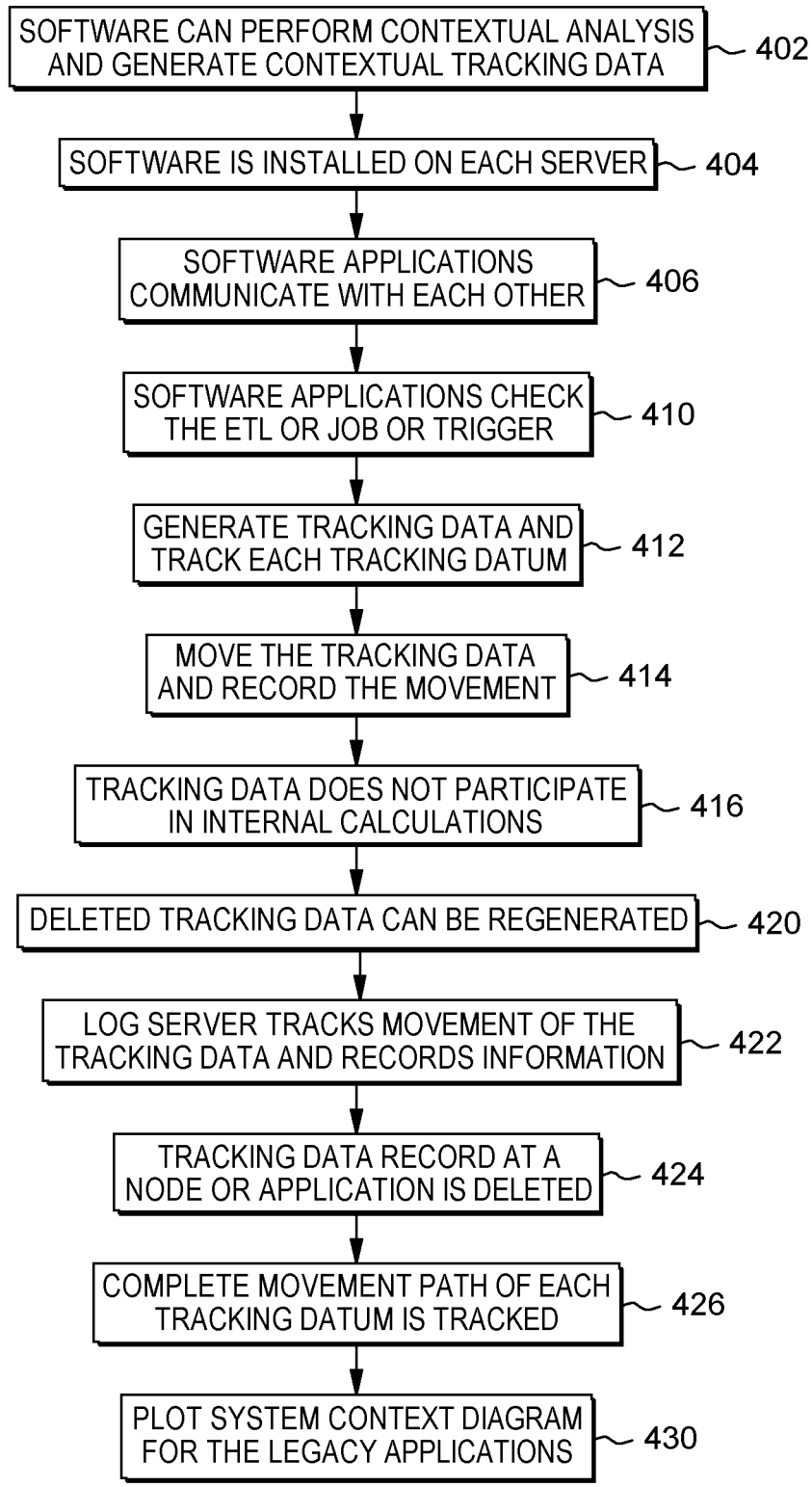
FIG. 4 illustrates a method that may be used to implement an embodiment of the invention.

FIG. 4 illustrates an implementation procedure 400 in one embodiment of the invention. As represented at 402, the software application can perform contextual analysis of code and accordingly can find exception logic, filter criteria, data branching, and other features of a legacy application. Accordingly, the software application will generate contextual tracking data and transmit the same main data transformation stream. In embodiments of the invention, the tracking data can be data in relational databases, a file in a folder, a message file, or another suitable form. At 404, the software application is installed in each server where a legacy application is running. As represented at 406, the software applications installed in the servers communicate with each other, share information, and connect to a trace database. At 410, the software applications check the ETL or job or trigger, and accordingly, one or more contextual tracking datums are created for each data transfer node of the legacy applications.

At 412, the software applications generate contextual tracking data in each legacy application, and the trace server tracks each such tracking datum individually. As represented at 414, the data transfer method/code moves the tracking data from one data transfer node to another node, and accordingly, the software applications record the movement path of the tracking data across the legacy application. As represented at 416, during any internal calculation in the legacy applications, the contextual tracking data does not participate in the calculation, and the contextual tracking data moves as separate data. As represented at 420, if the data transfer process deletes any tracking datum, then the software application will regenerate another tracking data element considering the new logic, and the software application records the movement path of the new generated tracking data.

At 422, the trace or log server tracks the movement of each contextual tracking date element from one data transfer node to another data transfer node along with the application names, server names, and other information. As represented at 424, once a tracking datum is moved to another application or to another data transfer node, then the software application automatically deletes the contextual tracking record to make the application clean.

The contextual tracking data are not relevant to the business purpose of the legacy application. These data are only used for tracking purposes and, accordingly, identifying the data flow in the legacy application. In embodiments of the invention, after the data flow is identified, the tracking data are deleted from the system so that these data do not occupy the database and create any errors in the report. The metadata of this contextual tacking data may include the application or table where the data are generated, when the data are created, and tracking the flow of the data in the different processes.

As represented at 426, the software application tracks the movement of each tracking datum on a real-time basis and the complete movement path of each tracking datum is tracked. At 430, the trace data is used for plotting an end-to-end system context diagram for the legacy applications.

A wide range of applications may be analyzed by using embodiments of the invention, and many enterprises may be able to tack data flow in all the applications of the enterprise using embodiments of the invention. Further, in embodiments of the invention, data flow can be identified within an application and also across applications.

Figure 5:
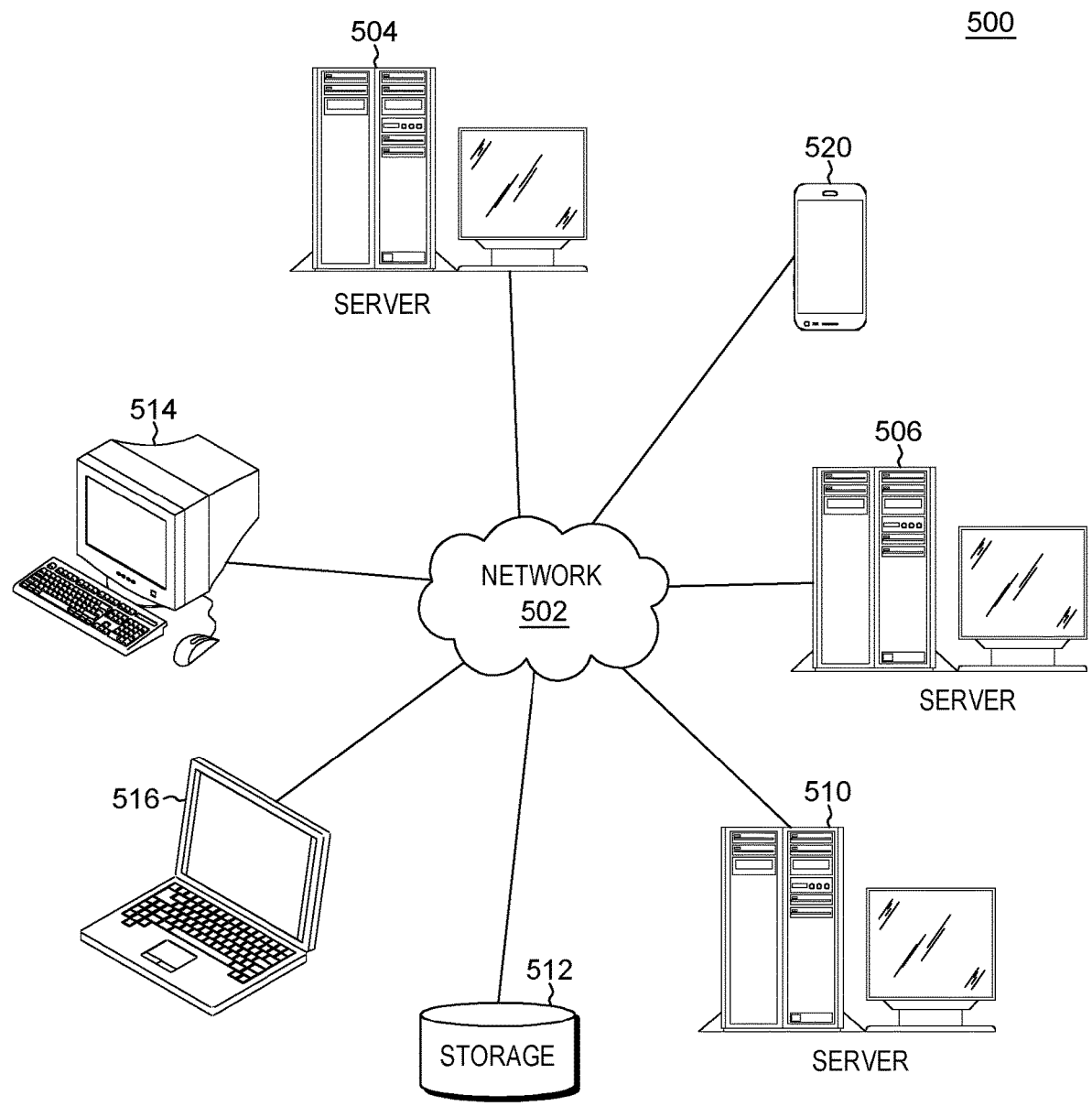
FIG. 5 shows a computer network that may be used to practice embodiments of the invention.

Aspects of the invention may be carried out on a computer system or network of computer systems. FIG. 5 depicts a pictorial representation of a networked computer system 500 in which embodiments of this invention may be implemented. Networked system 500 includes a network 502, which is the medium used to provide communications links between various devices and computers connected together within the networked system. Network 502 may include connections, such as wire, wireless communication links, or fiber optic cables, and network 502 may also be the Internet.

In the depicted example, servers 504, 506 and 510 are connected to network 502 along with storage unit 512. In addition, computing devices 514, 516 and 520 are connected to network 502. These computing devices 514, 516 and 520 may be, for example, personal computers, workstations, laptops, mobile computers or other computing devices.

Networked system 500 may include additional servers, computers, and other devices not shown. Networked system 500 may be implemented as a number of different types of networks, such as for example, the Internet, an intranet, a local area network (LAN), or a wide area network (WAN). FIG. 5 is intended as an example, and not as an architectural limitation for the invention.

Figure 6:
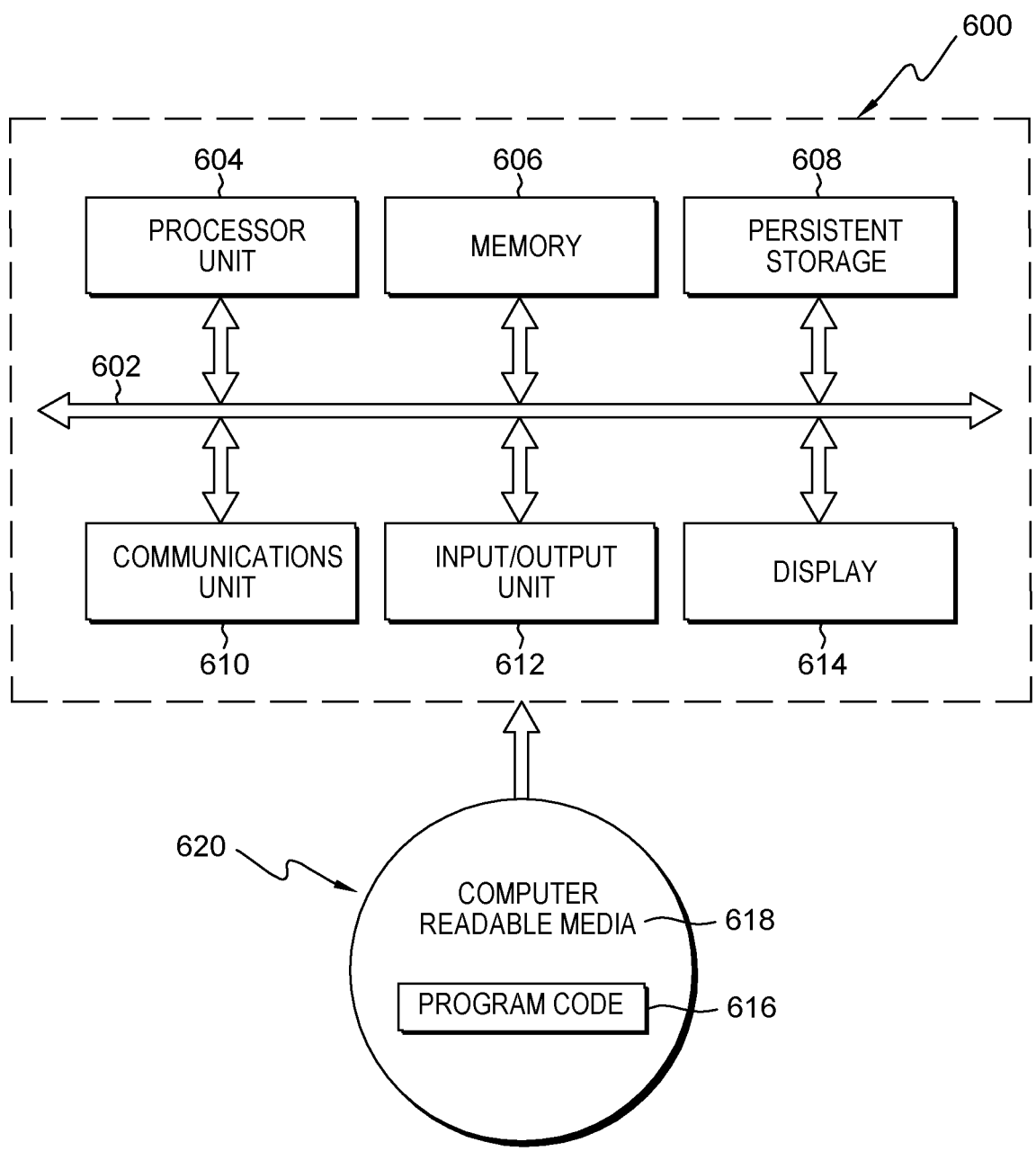
FIG. 6 shows a data processing system that may be used in the computer network of FIG. 5.

With reference now to FIG. 6, a block diagram of a data processing system 600 is shown. Data processing system 600 is an example of a computer, such as servers 504, 506 and, or computing devices 514, 516 and 520 in FIG. 5. In this illustrative example, data processing system 600 includes communications fabric 602, which provided communications between processor unit 604, memory 606, persistent storage 608, communications unit 610, input/output (I/O) unit 612, and display 614.

Processor unit 604 serves to execute instructions for software that may be loaded into memory 606. Processor unit 604 may be a set of one or more processors or may be a multi-processor core, depending on the particular implementation. Memory 606 and persistent storage 608 are examples of storage devices. Memory 606, in these examples, may be a random access memory or any other suitable volatile or non-volatile storage device. Persistent storage 608 may take various forms depending on the particular implementation. For example, persistent storage 608 may be a hard drive, a flash memory, a rewritable optical disk, a rewritable magnetic tape, or some combination of the above.

Communications unit 610, in these examples, provides for communications with other data processing systems or devices. In these examples, communications unit 610 is a network interface card. Communications unit 610 may provide communications through the use of either or both physical and wireless communications links. Input/output unit 612 allows for input and output of data with other devices that may be connected to data processing system 600. For example, input/output unit 612 may provide a connection for user input through a keyboard and mouse. Further, input/output unit 612 may send output to a printer. Display 614 provides a mechanism to display information to a user.

Those of ordinary skill in the art will appreciate that the hardware in FIGS. 5 and 6 may vary depending on the implementation. Other internal hardware or peripheral devices, such as flash memory, equivalent non-volatile memory, or optical disk drives and the like, may be used in addition to or in place of the hardware depicted in FIGS. 5 and 6.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The description of the invention has been presented for purposes of illustration and description, and is not intended to be exhaustive or to limit the invention in the form disclosed. Many modifications and variations will be apparent to those of ordinary skill in the art without departing from the scope of the invention. The embodiments were chosen and described in order to explain the principles and applications of the invention, and to enable others of ordinary skill in the art to understand the invention. The invention may be implemented in various embodiments with various modifications as are suited to a particular contemplated use.

The invention claimed is:

1. A method of tracking data flow in a given application on a computer, the method comprising:
    performing a contextual analysis of the given application to identify specified features of the given application;
    generating contextual tracking data for the given application, wherein the contextual tracking data moves through the given application;
    identifying positions of the contextual tracking data as the contextual tracking data move through the given application;
    using said identified positions of the contextual tracking data for tracing the movement of the contextual tracking data through the given application;
    generating specified information about the contextual tracking data and the movement of the contextual tracking data through the given application;
    recording a tracing log including said specified information about the contextual tracking data and the movement of the contextual tracking data through the given application; and
    creating a data flow sequence for the given application from the information in the tracing log.

2. The method according to claim 1, wherein the specified features of the given application include exception logic, filter criteria and data branches.

3. The method according to claim 1, wherein:
    the specified features of the given application include a specified group of data transfer nodes; and
    the generating contextual tracking data includes generating contextual tracking data for each of the specified group of data transfer nodes.

4. The method according to claim 3, wherein each of the contextual tracking data moves from one of the data transfer nodes of the given application to another one of the data transfer nodes of the given application.

5. The method according to claim 3, wherein the specified information about the contextual tracking data includes specified information about the data transfer nodes.

6. The method according to claim 3, further comprising deleting contextual tracking data records at specified times.

7. The method according to claim 6, wherein the deleting contextual tracking data records includes after one of the contextual tracking datum has been transferred from one of the nodes of the given application, deleting the contextual tracking data record for said one of the contextual tracking datum at said one of the nodes after said one of the contextual tracking datum has completed the moving through the given application.

8. The method according to claim 1, further comprising:
    installing a data tracking software program on the computer, and wherein:
    the performing a contextual analysis of the given application includes the data tracking software program performing the contextual analysis of the given application; and
    the generating contextual tracking data includes the data tracking software program generating the contextual tracking data.

9. The method according to claim 1, wherein:
    the contextual tracking data moves from the given application to another application; and
    the tracing movement of the contextual tracking data includes tracking movement of the contextual tracking data within the given application and across the given application and the another application.

10. A method of tracking data flow in a given application on a computer, the method comprising:
    performing a contextual analysis of the given application to identify specified features of the given application;
    generating contextual tracking data for the given application, wherein the contextual tracking data moves through the given application;
    tracing the movement of the contextual tracking data through the given application;
    generating specified information about the contextual tracking data and the movement of the contextual tracking data through the given application;
    recording a tracing log including said specified information about the contextual tracking data and the movement of the contextual tracking data through the given application;
    creating a data flow sequence for the given application from the information in the tracing log; and
    when one of the contextual tracking datum is deleted before said one of the contextual tracking datum has completed moving through the given application, regenerating the deleted one contextual tracking datum and replacing the deleted one of the contextual tracking data with the regenerated one of the contextual tracking data.

11. A computer system for tracking data flow in a given application, comprising:
    a data store for holding data;
    a computer operatively connected to the data store for transmitting data to the data store, and comprising one or more processor units, wherein a given application runs on the computer, and the one or more processor units are configured for:
    performing a contextual analysis of the given application to identify specified features of the given application;
    generating contextual tracking data for the given application;
    inserting the contextual tracking data into the given application, wherein the contextual tracking data moves through the given application;
    identifying positions of the contextual tracking data as the contextual tracking data move through the given application;
    using said identified positions of the contextual tracking data for tracing the movement of the contextual tracking data through the given application;
    generating specified information about the contextual tracking data and the movement of the contextual tracking data through the given application;

recording a tracing log including said specified information about the contextual tracking data and the movement of the contextual tracking data through the given application; and creating a data flow sequence for the given application from the information in the tracing log.

12. The system according to claim 11, wherein the specified features of the given application include exception logic, filter criteria and data branches.

13. The system according to claim 11, wherein:
the specified features of the given application include a specified group of data transfer nodes; and
the generating contextual tracking data includes generating contextual tracking data for each of the specified group of data transfer nodes.

14. The system according to claim 13, wherein each of the contextual tracking data moves from one of the data transfer nodes of the given application to another one of the data transfer nodes of the given application.

15. The system according to claim 13, wherein the specified information about the contextual tracking data includes specified information about the data transfer nodes.

16. A computer readable program product for tracking data flow in an application on a computer, the computer readable program product comprising:
a computer readable storage medium having program instructions embodied therein, the program instructions executable by a specified computer to cause the specified computer to perform the method of:
performing a contextual analysis of the given application to identify specified features of the given application;
generating contextual tracking data for the given application;
inserting the contextual tracking data into the given application, wherein the contextual tracking data moves through the given application;
identifying positions of the contextual tracking data as the contextual tracking data move through the given application;
using said identified positions of the contextual tracking data for tracing the movement of the contextual tracking data through the given application;
generating specified information about the contextual tracking data and the movement of the contextual tracking data through the given application;
recording a tracing log including said specified information about the contextual tracking data and the movement of the contextual tracking data through the given application; and
creating a data flow sequence for the given application from the information in the tracing log.

17. The computer program product according to claim 16, wherein the specified features of the given application include exception logic, filter criteria and data branches.

18. The computer program product according to claim 17, wherein:
the specified features of the given application include a specified group of data transfer nodes; and
the generating contextual tracking data includes generating contextual tracking data for each of the specified group of data transfer nodes.

19. The computer program product according to claim 18, wherein each of the contextual tracking data moves from one of the data transfer nodes of the given application to another one of the data transfer nodes of the given application.

20. The computer program product according to claim 18, wherein the specified information about the contextual tracking data includes specified information about the data transfer nodes.

* * * * *